US008954301B2

(12) United States Patent
Sieben (10) Patent No.: US 8,954,301 B2
(45) Date of Patent: Feb. 10, 2015

(54) SYSTEM AND METHOD FOR CONFIGURING AN AIRCRAFT PASSENGER CABIN (75) Inventor: Martin Sieben, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 359 days.

(21) Appl. No.: 13/432,857

(22) Filed: Mar. 28, 2012

(65) Prior Publication Data
US 2012/0239354 A1 Sep. 20, 2012

Related U.S. Application Data (63) Continuation of application No. PCT/EP2010/005250, filed on Aug. 26, 2010.

(60) Provisional application No. 61/246,195, filed on Sep. 28, 2009.

(30) Foreign Application Priority Data

Sep. 28, 2009 (DE) .......................... 10 2009 043 327

(51) Int. Cl.
G06F 17/50 (2006.01)
G06Q 10/06 (2012.01)
(Continued)

(52) U.S. Cl.
CPC ............ *G06F 17/5095* (2013.01); *G06Q 10/06* (2013.01); *G06Q 10/08* (2013.01); *G06F 2217/46* (2013.01)
USPC .............................. 703/2; 703/22; 244/114 R (58) Field of Classification Search
CPC .......... G06F 17/50; G06F 19/00; G06Q 10/06
USPC ...................................... 703/1, 2, 22; 244/117
See application file for complete search history.

(56) References Cited

U.S. PATENT DOCUMENTS 4,774,514 A 9/1988 Hildebrandt et al.
6,968,298 B2 * 11/2005 Lohmann et al. ................. 703/1
(Continued)

FOREIGN PATENT DOCUMENTS

| CN | 1011666650 | 4/2008 |
| DE | 100 41 031 | 3/2002 |

(Continued)

OTHER PUBLICATIONS

English language summary of Chinese of Chinese Office Action, CN 201080043153.4 Airbus Operations GmbH, Apr. 8, 2014.
(Continued)

*Primary Examiner* — Thai Phan
(74) *Attorney, Agent, or Firm* — Krieg DeVault LLP (57) ABSTRACT The invention relates to a system (10) for configuring an aircraft passenger cabin, said system comprising a first database (12) that stores cabin equipment component data pertaining to cabin equipment components selected for and included in a configuration of the aircraft passenger cabin. In addition, said system (10) comprises a second database (14) that stores configuration rules pertaining to the configuration of the aircraft passenger cabin. Finally, the system (10) comprises a unit (16) for generating a documentation, configured in such a way that documentation of the configured aircraft passenger cabin is generated on the basis of at least one user-defined configuration parameter, on the basis of the cabin equipment component data stored in the first database (12), and on the basis of the configuration rules stored in the second database (14).

14 Claims, 2 Drawing Sheets (51) Int. Cl.
*G06Q 10/08* (2012.01)
*G06F 21/00* (2013.01)

(56) References Cited

U.S. PATENT DOCUMENTS

| | | | |
|---|---|---|---|
| 7,581,697 B1* | 9/2009 | Hagemeister et al. | 244/117 R |
| 2002/0026296 A1* | 2/2002 | Lohmann et al. | 703/1 |
| 2004/0153295 A1* | 8/2004 | Lohmann et al. | 703/1 |
| 2005/0043836 A1 | 2/2005 | Jaworski et al. | |
| 2005/0055180 A1* | 3/2005 | Pischke et al. | 703/1 |
| 2005/0071138 A1 | 3/2005 | Conchi et al. | |
| 2005/0209830 A1 | 9/2005 | Lee et al. | |
| 2007/0233434 A1 | 10/2007 | Lee | |
| 2008/0109237 A1 | 5/2008 | Suess et al. | |
| 2008/0116686 A1 | 5/2008 | Gonnsen et al. | |
| 2008/0277527 A1 | 11/2008 | Fokken et al. | |
| 2010/0106466 A1* | 4/2010 | Frohlich et al. | 703/2 |

FOREIGN PATENT DOCUMENTS

| | | |
|---|---|---|
| DE | 10 2005 007 058 | 8/2006 |
| DE | 10 2005 055 133 | 2/2007 |
| DE | 10 2005 054 890 | 5/2007 |
| WO | WO 02/073473 | 9/2002 |

OTHER PUBLICATIONS

International Search Report and Written Opinion, Jun. 30, 2011, PCT/US2010/005250.

* cited by examiner

SYSTEM AND METHOD FOR CONFIGURING AN AIRCRAFT PASSENGER CABIN

The present application is a continuation patent application of PCT/EP2010/005250, filed Aug. 26, 2010, which claims the benefit of U.S. Provisional Application No. 61/246,195, filed Sep. 28, 2009 and claims priority to German Patent Application No. 10 2009 043 327.9, filed Sep. 28, 2009, each of which is incorporated herein by reference.

The invention relates to a system and a method for configuring an aircraft passenger cabin.

In the operation of modern commercial aircraft, efforts to utilize the aircraft as optimally as possible are increasingly gaining in importance. An optimization of the aircraft utilization is, however, frequently only possible if the aircraft passenger cabin can be flexibly converted at least to a certain extent. In this connection, DE 10 2005 007 058 A1 and DE 10 2005 054 890 A1, for example, respectively describe a system of line connections and a fastening system which enable fittings provided in an aircraft passenger cabin, such as e.g. galleys or lavatories, to be arranged at different positions in the aircraft passenger cabin.

It may be economically worthwhile for an airline to operate a commercial aircraft at certain times, e.g. during the holiday period, with a greater number of economy class seats and at other times, e.g. outside the holiday period, with a greater number of business class seats. Moreover, it may be desirable for an airline to vary the total number of seats in the aircraft passenger cabin depending on the utilization or route, for example. An optimization of the aircraft utilization therefore requires not only a positioning of monuments, provided in an aircraft passenger cabin, as flexibly as possible in the aircraft passenger cabin, but also a division of the aircraft passenger cabin into a business class area and an economy class area as flexibly as possible and an adaptation of the distances between seat rows, arranged one behind the other in the aircraft passenger cabin, as flexibly as possible.

At present, commercial aircraft are supplied by manufacturers with a fixed passenger cabin configuration, i.e. with a fixed division of the aircraft passenger cabin into a business class area and an economy class area and with a fixed number of seat rows arranged one behind the other at a fixed distance. For the fixed passenger cabin configuration, the aircraft manufacturer provides a supplementary certified documentation over and above the type certificate of the aircraft, the so-called modification approval sheets.

A conversion of the passenger cabin configuration fixed by the manufacturer therefore requires not only a restructuring of the seat arrangement in the passenger cabin. Rather, a corresponding documentation of the reconfiguration, a so-called service bulletin, is also necessary, and this can be provided only by the aircraft manufacturer or the owner of the type certificate of the aircraft. Moreover, the new passenger cabin configuration must have an additional certificate, a so-called supplemental type certificate, which can be provided only by selected organizations. Consequently, the conversion of a passenger cabin configuration of a commercial aircraft fixed by the manufacturer is very time-consuming and costly. Measures requiring a flexible configuration of the aircraft passenger cabin to optimize the aircraft utilization are therefore currently realizable often only in a very restricted manner or not at all.

The object on which the present invention is based is to provide a system and a method for configuring an aircraft passenger cabin which enable a simple and time-saving initial configuration and a simple and time-saving modification of an existing passenger cabin configuration.

This object is achieved by a system for configuring an aircraft passenger cabin having the features of Claim 1 and a method for configuring an aircraft passenger cabin having the features of Claim 8.

The system according to the invention for configuring an aircraft passenger cabin comprises a first database, in which, for selected cabin equipment components, cabin equipment component data relevant to a configuration of the aircraft passenger cabin including these cabin equipment components are stored. The first database performs a dual function. On the one hand, the first database defines cabin equipment components which are available at all for the configuration by means of the configuration system according to the invention, i.e. it defines which cabin equipment components can, e.g. in the course of a reconfiguration of the aircraft passenger cabin, be removed from the aircraft passenger cabin, replaced by other cabin equipment components or additionally installed in the aircraft passenger cabin. Cabin equipment components for which the first database does not contain any cabin equipment component data are not available for the configuration by means of the configuration system according to the invention, i.e. they cannot, e.g. in the course of a reconfiguration of the aircraft passenger cabin, be removed from the aircraft passenger cabin, replaced by other cabin equipment components or additionally installed in the aircraft passenger cabin. By the selection of cabin equipment components available for the configuration by means of the configuration system according to the invention and the inclusion of corresponding cabin equipment component data relating to the selected cabin equipment components in the first database, the extent to which configuration measures by means of the configuration system according to the invention are permissible is thus defined. Safety-relevant cabin equipment components, for example, can thus be reliably excluded from a reconfiguration. Furthermore, it is possible to limit the total extent of the configuration measures by means of the configuration system according to the invention in the aircraft passenger cabin by appropriately selecting cabin equipment components available for the configuration by means of the configuration system according to the invention. In this way, high safety standards can also be met.

On the other hand, the first database supplies all the cabin equipment component data required for a configuration of the aircraft passenger cabin including a selected cabin equipment component. The cabin equipment component data stored in the first database for the selected cabin equipment components may be data characteristic of the dimensions and/or the functional properties of the selected cabin equipment components. For example, the first database may contain dimensions of the selected cabin equipment components, information on the connection of the selected cabin equipment components to higher-order aircraft systems and energy consumption and/or power data of the selected cabin equipment components. Preferably, the first database contains for all the selected cabin equipment components a comprehensive documentation of the cabin equipment component data relevant to a configuration of the aircraft passenger cabin including the selected cabin equipment components.

Furthermore, the system according to the invention for configuring an aircraft passenger cabin comprises a second database, in which configuration rules relevant to a configuration of the aircraft passenger cabin are stored. In other words, the second database defines the general requirements for the configuration of the aircraft passenger cabin. In particular, the second database may contain regulations on the layout of an aircraft passenger cabin laid down by authorities and/or manufacturers. The regulations may be generally applicable regulations and also aircraft type-dependent regulations. For example, a permissible maximum number of passengers, permissible aisle widths, permissible minimum and/or maximum distances between specific cabin equipment components, such as e.g. seat rows arranged one behind the other, or assignment rules of service devices and emergency equipment components, such as e.g. oxygen supply systems to passenger seats arranged in the aircraft passenger cabin, may be stored in the second database.

The second database may furthermore contain general information essential for a configuration of the aircraft passenger cabin. For example, general or aircraft type-specific data relating to the aircraft passenger cabin, such as e.g. its dimensions or information about materials employed in the aircraft passenger cabin, may be stored in the second database. Finally, the second database may contain additional information, such as e.g. assembly or maintenance instructions. For example, comprehensive information relating to the deinstallation and/or the installation of cabin equipment components, in particular of selected cabin equipment components defined in the first database, may be stored in the second database.

Finally, the system according to the invention for configuring an aircraft passenger cabin comprises a documentation generating unit which may be implemented in the form of hardware or software. The documentation generating unit is adapted to generate a documentation of the configured aircraft passenger cabin on the basis of at least one user-defined configuration parameter and on the basis of the cabin equipment component data stored in the first database and of the configuration rules stored in the second database. The documentation generated by the documentation generating unit consequently contains, besides the user-defined configuration parameter, selected data from the first database and the second database. In particular, the documentation generating unit is adapted to include, in the documentation of the configured aircraft passenger cabin, for a user-defined configuration parameter all the relevant cabin equipment component data associated with this user-defined configuration parameter from the first database and configuration data from the second database. This ensures a complete and correct, automatic documentation of the configured aircraft passenger cabin.

As a user-defined configuration parameter, the documentation generating unit may process, for example, the total number of seat rows in the aircraft passenger cabin, a distance between seat rows arranged one behind the other, a division of the aircraft passenger cabins into a business class area and an economy class area, etc. The documentation generating unit thus enables a "dynamic" documentation generation in dependence on the user-defined configuration parameter and thus a considerable simplification of the complexity involved with generating the documentation. Set-up times and downtimes of the aircraft, required for the configuration and in particular for the reconfiguration of the aircraft passenger cabin, can thereby be significantly reduced.

In principle, it is conceivable for the documentation generating unit to generate the documentation of the configured aircraft passenger cabin exclusively on the basis of the user-defined configuration parameter and on the basis of the cabin equipment components stored in the first database and of the configuration rules stored in the second database. For example, a documentation generated by the documentation generating unit may contain a total number of seat rows in the aircraft passenger cabin as the user-defined configuration parameter. Cabin equipment component data, connected with this user-defined configuration parameter, from the first database may then, for example, be data relating to the number and the configuration of cabin equipment components assigned to the individual seat rows or seats, such as e.g. individual air supplies, personal service units, indicating elements, emergency oxygen supply system components, lighting elements, entertainment electronics components or the like. Finally, from the second database, configuration rules relating to a maximum number of seat rows in the aircraft passenger cabin, assignment rules of cabin equipment components to individual seat rows, etc. may be included in the documentation.

Preferably, however, the documentation generating unit is further adapted to determine at least one documentation-relevant configuration parameter on the basis of at least one user-defined configuration parameter, and to include it in the documentation of the configured aircraft passenger cabin. Documentation-relevant configuration parameters may, for example, be data relating to the position and the properties of cabin equipment components in the configured aircraft passenger cabin. If possible and/or required, the documentation generating unit may access the first and/or the second database to determine a documentation-relevant configuration parameter.

Furthermore, the documentation generating unit may be adapted to access an equation database to determine a documentation-relevant configuration parameter on the basis of a user-defined configuration parameter. The equation database may contain, for example, equations which enable determination of the exact position of a cabin equipment component in the aircraft passenger cabin in dependence on one or more user-defined configuration parameter(s). For example, the equation database may contain an equation which enables the exact position of a seat in the aircraft passenger cabin to be determined from a starting position, a user-defined seat distance and a seat row number. Similarly, it is conceivable to provide in the equation database an equation which enables, for example, determination of the weight of service systems assigned to individual seats or seat rows, such as e.g. individual air supplies, personal service units, indicating elements, oxygen supply systems, lighting elements or entertainment electronics components, from a user-defined number of seat rows and/or a user-defined seat distance and from cabin equipment component data, stored in the first database, for the cabin equipment components assigned to the individual seats or seat rows.

The equation database which may be accessed by the documentation generating unit to determine a documentation-relevant configuration parameter thus constitutes a kind of parametric basic framework for the documentation generated by the documentation generating unit. The equation database may contain equations for determining all the desired documentation-relevant configuration parameters, so that the extent and the content of the documentation generated by the documentation generating unit may be controlled, as desired, by the design of the equation database. By a suitably comprehensive design of the equation database, it is thus possible to generate a documentation which is equivalent to previously used documentation with a defined configuration description.

The documentation generating unit of the system according to the invention for configuring an aircraft passenger cabin my further be adapted to request at least one additional user-defined configuration parameter to determine a documentation-relevant configuration parameter. For example, to determine a documentation-relevant configuration parameter using an equation stored in the equation database, the documentation generating unit may request all the user-defined configuration parameters required to determine the documentation-relevant configuration parameter using the equation from a user. This enables on the one hand a comprehensive documentation of the configured aircraft passenger cabin. Nevertheless, the generation of the documentation with the aid of the documentation generating unit is very convenient for a user.

The documentation generating unit may further be adapted to compare a desired user-defined configuration parameter with the cabin equipment components stored in the first database and/or the configuration rules stored in the second database. In the case of a documentation generating unit adapted in this manner, a user can input a specific user-defined configuration parameter, for example a desired seat distance, into the documentation generating unit. The documentation generating unit then checks whether the user-defined configuration parameter may be realized with the aid of cabin equipment components for which corresponding cabin equipment component data are stored in the first database. For example, the documentation generating unit checks whether the user-defined seat distance may be realized by corresponding selected cabin equipment components for which the first database contains corresponding cabin equipment component data. Furthermore, the documentation generating unit checks whether the user-defined configuration parameter is in accord with the configuration rules stored in the second database, i.e. for example whether the desired user-defined seat distance corresponds to at least a minimum permissible seat distance.

Preferably, the documentation generating unit is further adapted to generate a documentation of the passenger cabin configured with reference to the desired user-defined configuration parameter only if the desired user-defined configuration parameter is permissible against the background of the cabin equipment component data stored in the first database and/or the configuration rules stored in the second database. In other words, the documentation generating unit generates a documentation of the configured aircraft passenger cabin only if the user-defined configuration parameter is permissible in the light of the data stored in the first database and of the data stored in the second database. The generation of a documentation for impermissible configuration measures is thus reliably prevented.

The cabin equipment component data stored in the first database, the configuration rules stored in the second database and/or the documentation of the configured aircraft passenger cabin generated by the documentation generating unit preferably corresponds/correspond to certification rules laid down by manufacturers and/or authorities. If the cabin equipment component data stored in the first database, the configuration rules stored in the second database and the documentation of the configured aircraft passenger cabin generated by the documentation generating unit satisfy corresponding certification rules, an automatic certification can take place, i.e. an additional certification of the documentation generated by the documentation generating unit can be dispensed with. As a result, the generation of the documentation of the configured aircraft passenger cabin and consequently the configuration of the aircraft passenger cabin itself is markedly simplified.

The documentation generating unit may comprise an input unit for input of a desired user-defined configuration parameter by a user. Furthermore, the documentation generating unit may comprise a processing unit which is adapted to process the desired user-defined configuration parameter to generate the documentation of the configured passenger cabin. Finally, the documentation generating unit may comprise an output unit which is adapted to output the documentation of the aircraft passenger cabin configured with reference to the desired user-defined configuration parameter or to output a message that the desired user-defined configuration parameter is not permissible against the background of the cabin equipment component data stored in the first database and/or the configuration rules stored in the second database.

The processing unit of the documentation generating unit is preferably implemented on a first computer. The input unit and/or the output unit of the documentation generating unit are, by contrast, preferably implemented on a second computer. The second computer may be a computer spatially separated from the first computer. Such a system architecture enables all the functions of the documentation generating unit which are relevant to generating the documentation of the configured aircraft passenger cabin to be separated from user-accessible functions of the documentation generating unit. For example, the processing unit may be implemented on a computer which is accessible only to the aircraft manufacturer, while the input unit and/or the output unit may be implemented on a computer accessible to the user himself. This makes it possible for the aircraft manufacturer, for example, to maintain and update the processing unit of the documentation generating unit to the required extent. Moreover, safety risks due to unintended manipulation of the processing unit are thereby minimized.

The first database and/or the second database may be implemented on the first computer, on which the processing unit of the documentation generating unit is also implemented. Alternatively to this, however, it is also conceivable to implement the first and/or the second database on a third computer, it being possible, however, for the third computer once again to be a computer spatially separated from the second computer. This system architecture also prevents unintended modification of the first database and/or of the second database by a user and enables unhindered maintenance and updating of the first database and/or of the second database, for example, by the aircraft manufacturer.

A method according to the invention for configuring an aircraft passenger cabin includes the steps: providing a first database, in which, for selected cabin equipment components, cabin equipment component data relevant to a configuration of the aircraft passenger cabin including these cabin equipment components are stored, and providing a second database, in which configuration rules relevant to a configuration of the aircraft passenger cabin are stored. Furthermore, the method according to the invention comprises generating a documentation of the configured aircraft passenger cabin on the basis of at least one user-defined configuration parameter and on the basis of the cabin equipment component data stored in the first database and of the configuration rules stored in the second database by means of a documentation generating unit.

The documentation generating unit preferably determines at least one documentation-relevant configuration parameter on the basis of at least one user-defined configuration parameter, the documentation generating unit being able to access an equation database to determine a documentation-relevant configuration parameter.

Preferably, the documentation generating unit requests at least one additional user-defined configuration parameter to determine a documentation-relevant configuration parameter.

The documentation generating unit may compare a desired user-defined configuration parameter with the cabin equipment component data stored in the first database and/or the configuration rules stored in the second database. Preferably, the documentation generating unit generates a documentation of the aircraft passenger cabin configured with reference to the desired user-defined configuration parameter only if the desired user-defined configuration parameter is permissible against the background of the cabin equipment component data stored in the first database and/or the configuration rules stored in the second database.

The cabin equipment component data stored in the first database, the configuration rules stored in the second database and/or the documentation of the configured aircraft passenger cabin generated by the documentation generating unit preferably corresponds/correspond to certification rules laid down by manufacturers and/or authorities.

Preferably, in the case of the method according to the invention for configuring an aircraft passenger cabin, a desired user-defined configuration parameter is input into an input unit of the documentation generating unit. A processing unit of the documentation generating unit processes the desired user-defined configuration parameter to generate the documentation of the configured aircraft passenger cabin. Finally, the documentation of the aircraft passenger cabin configured with reference to the desired user-defined configuration parameter or a message that the desired user-defined configuration parameter is not permissible against the background of the cabin equipment component data stored in the first database and/or the configuration rules stored in the second database is output by an output unit.

The processing unit of the documentation generating unit is preferably implemented on a first computer. The input unit and/or the output unit of the documentation generating unit is/are preferably implemented on a second computer, the second computer preferably being a computer spatially separated from the first computer.

The system according to the invention and the method according to the invention for configuring an aircraft passenger cabin may be employed both for the initial configuration of an aircraft passenger cabin and for the reconfiguration of an aircraft passenger cabin.

A preferred embodiment of the invention will now be explained in more detail with reference to the appended, schematic figures, of which

Figure 1:
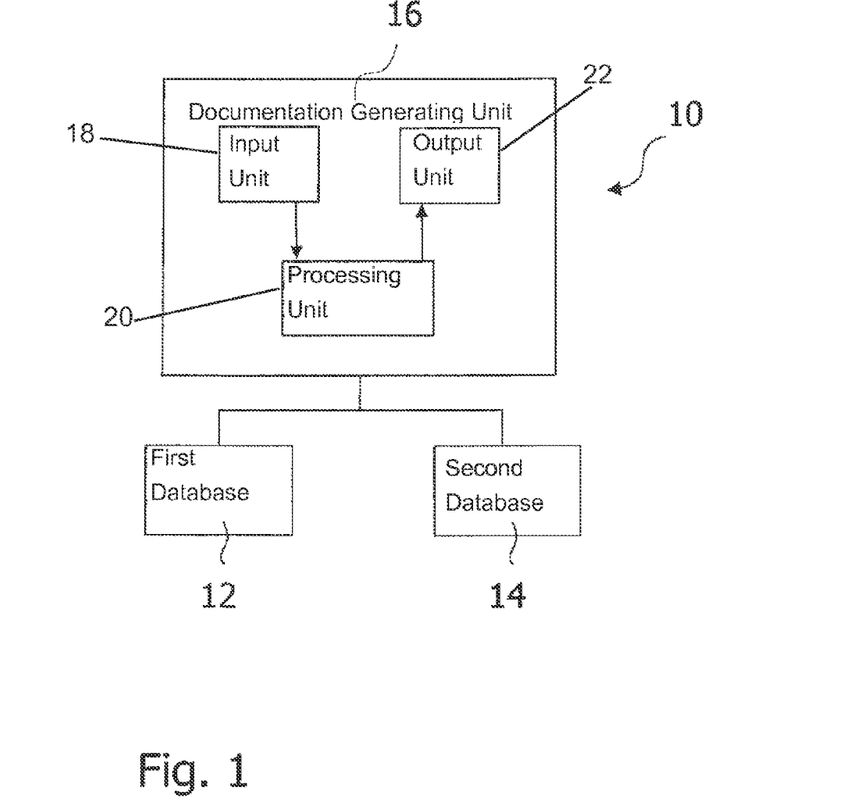
FIG. 1 shows a basic illustration of a system for configuring an aircraft passenger cabin.

A system 10, shown in FIG. 1, for configuring an aircraft passenger cabin comprises a first database 12, in which, for selected cabin equipment components, cabin equipment component data relevant to a configuration of the aircraft passenger cabin including these cabin equipment components are stored. Selected cabin equipment components for which cabin equipment component data are stored in the first database 12 are, for example, seats or seat rows arranged in the aircraft passenger cabin, and components assigned to these seats or seat rows, such as e.g. trim elements or luggage compartments, and service components, such as e.g. individual air supplies, personal service units, indicating elements, parts of an emergency oxygen supply system, lighting elements or entertainment electronics components. The cabin equipment component data stored in the first database for these cabin equipment components may be data characteristic of the dimensions and the functional properties of the components.

By storing corresponding cabin equipment component data in the first database 12, selected cabin equipment components are defined as cabin equipment components available for a configuration by means of the configuration system 10. In other words, cabin equipment components for which corresponding cabin equipment component data are stored in the first database 12 may, e.g. in the course of a reconfiguration of the aircraft passenger cabin, be removed from the aircraft passenger cabin, replaced by other cabin equipment components or additionally installed in the aircraft passenger cabin. Conversely, cabin equipment components for which no cabin equipment component data are stored in the first database 12 are excluded e.g. from reconfiguration measures. This makes it possible, for example, to exclude safety-relevant cabin equipment components specifically from a reconfiguration of the aircraft passenger cabin.

The system 10 for configuring an aircraft passenger cabin further comprises a second database 14. Configuration rules relevant to a configuration of the aircraft passenger cabin are stored in the second database 14. Configuration rules stored in the second database 14 may contain, for example, regulations on the layout of an aircraft passenger cabin laid down by authorities and/or manufacturers. For example, rules relating to specific limit values, such as e.g. a permissible maximum number of passengers, permissible aisle width ranges, permissible minimum and/or maximum distances between specific cabin equipment components, such as e.g. seat rows arranged one behind the other, or assignment rules of service devices and emergency equipment components to the passenger seats arranged in the aircraft passenger cabin, may be stored in the second database 14. Furthermore, the second database 14 may contain general information essential for a configuration of the aircraft passenger cabin, such as e.g. information on the dimensions of the aircraft passenger cabin or information on materials processed in the aircraft passenger cabin. Finally, additional information, such as e.g. assembly or maintenance instructions for specific cabin equipment components, may be contained in the second database 14.

Finally, the system 10 comprises a documentation generating unit 16. The documentation generating unit 16 for its part comprises an input unit 18, a processing unit 20 and an output unit 22. Via the input unit 18, a user may input a desired user-defined configuration parameter into the documentation generating unit 16. For example, a desired number of seat rows, a desired seat row distance or a desired division of the aircraft passenger cabin into a business class area and an economy class area may be input into the input unit 18 of the documentation generating unit 16 as user-defined configuration parameters. Further examples of user-defined configuration parameters which may be input via the input unit 18 into the documentation generating unit 16 comprise parameters assigned to individual cabin equipment components. For example, it may be input via the input unit 18 into the documentation generating unit 16 that the equipping of the configured aircraft passenger cabin with a cabin equipment component having specific cabin equipment component data, such as e.g. a specific service element type, is desired.

The user-defined configuration parameters input via the input unit 18 are processed in the processing unit 20 of the documentation generating unit 16. In particular, the processing unit 20 of the documentation generating unit 16 is adapted to compare a desired user-defined configuration parameter input via the input unit 18 with the cabin equipment component data stored in the first database 12 and the configuration rules stored in the second database 14. In other words, the processing unit 20 checks whether a desired user-defined configuration parameter input via the input unit 18 into the documentation generating unit 16 is realizable and permissible in view of the cabin equipment component data for selected cabin equipment components stored in the first database 12 and in view of the configuration rules stored in the second database 14. For example, the processing unit 20 of the documentation generating unit 16 may check whether a desired seat row distance input via the input unit 18 as a user-defined configuration parameter is realizable by appropriate selection and design of selected cabin equipment components for which corresponding cabin equipment component data are stored in the first database 12. Furthermore, the processing unit 20 may check whether the desired seat row distance input as a user-defined configuration parameter via the input unit 18 corresponds to a minimum seat row distance stored as configuration rules in the second database 14.

Only if the desired user-defined configuration parameter input via the input unit 18 into the documentation generating unit 16 is permissible against the background of the cabin equipment component data stored in the first database 12 and the configuration rules stored in the second database 14, does the processing unit 20 generate a documentation of the configured aircraft passenger cabin. The documentation of the configured aircraft passenger cabin generated by the processing unit 20 contains the user-defined configuration parameter input via the input unit 18 into the documentation generating unit or all the user-defined configuration parameters input via the input unit 18 into the documentation generating unit 16. Furthermore, the documentation contains cabin equipment component data required for the realization of the desired user-defined configuration parameter or the desired user-defined configuration parameters and taken from the first database 12. Finally, the configuration rules considered in the realization of the desired user-defined configuration parameter or the desired user-defined configuration parameters and contained in the second database 14 are also included in the documentation generated by the processing unit 20. The documentation generated by the processing unit 20 is output via the display unit 22 of the documentation generating unit 16.

If the processing unit 20 ascertains in the comparison of a desired user-defined configuration parameter with the cabin equipment component data stored in the first database 12 or the configuration rules stored in the second database 14 that the desired user-defined configuration parameter is not permissible against the background of the cabin equipment component data stored in the first database 12 or the configuration rules stored in the second database 14, the processing unit 20, by contrast, does not generate any documentation, but rather outputs via the display unit 22 a message indicating that the desired user-defined configuration parameter is not permissible against the background of the cabin equipment component data stored in the first database 12 or the configuration rules stored in the second database 14.

In principle, it is possible for the processing unit 20 of the documentation generating unit 16 to generate a documentation of the configured aircraft passenger cabin merely on the basis of user-defined configuration parameters input via the input unit 18 into the documentation generating unit 16 and on the basis of the cabin equipment component data stored in the first database 12 and of the configuration data stored in the second database 14. Alternatively to this, however, the processing unit 20 may also comprise an equation database containing equations for determining additional documentation-relevant configuration parameters on the basis of user-defined configuration parameters.

For example, the equation database may contain an equation which enables determination of an exact position of a seat in the configured aircraft passenger cabin on the basis of a starting position, of a seat row distance input as a user-defined configuration parameter into the input unit 18 of the documentation generating unit 16 and of a seat row number. The documentation-relevant configuration parameters determined in this way may be included in the documentation generated by the processing unit 20 of the documentation generating unit 16 in addition to the user-defined configuration parameters or instead of the user-defined configuration parameters. In order to ensure inclusion of all the relevant parameters in the documentation generated by the processing unit 20, the processing unit 20 is adapted to request all the user-defined configuration parameters required for determining a documentation-relevant configuration parameter. The request is output via the display unit 20 of the documentation generating unit 16, whereby a user is prompted to input additional user-defined configuration parameters via the input unit 18 into the documentation generating unit 16.

The cabin equipment component data stored in the first database 12, the configuration rules stored in the second database 14 and the documentation of the configured aircraft passenger cabin generated by the documentation generating unit 16 correspond to certification rules laid down both by manufacturers and authorities. An additional certification of the documentation of the configured aircraft passenger cabin generated by the documentation generating unit 16 is therefore no longer required.

The first database 12, the second database 14 and the processing unit 20 of the documentation generating unit 16 are implemented on a first computer. The input unit 18 and the output unit 22 of the documentation generating unit 16 are, by contrast, implemented on a second computer which may be spatially separated from the first computer. In this way, the first database 12, the second database 14 and the processing unit 20 may be implemented on a computer which is accessible, for example, only to an aircraft manufacturer. The aircraft manufacturer can then ensure proper maintenance and care of the first database 12, of the second database 14 and of the processing unit 20 of the documentation generating unit 16. The connection between the processing unit 20, the input unit 18 and the output unit 22 of the documentation generating unit 16 may be realized, for example, by an appropriate graphical interface.

Figure 2:
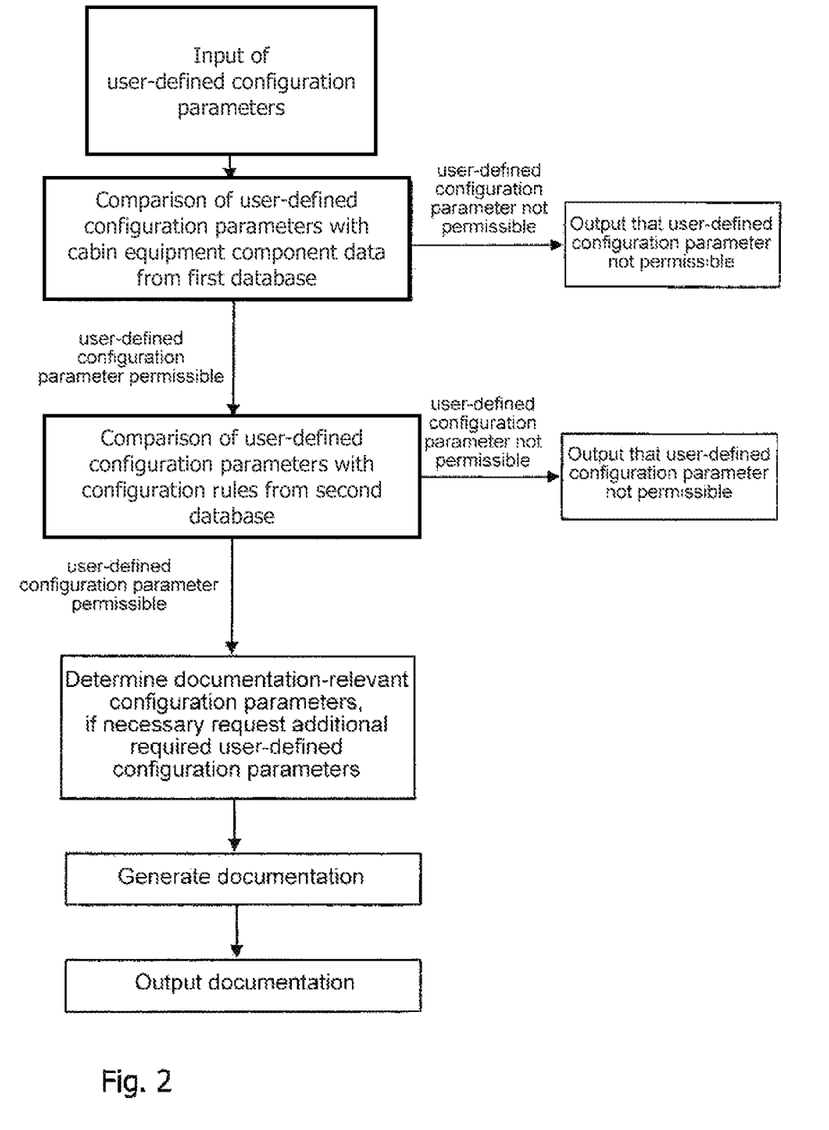
FIG. 2 shows a schematic flow chart of a method for configuring an aircraft passenger cabin using the system according to FIG. 1.

In a method, illustrated in FIG. 2, for configuring an aircraft passenger cabin, a user in a first step inputs via the input unit 18 of the documentation generating unit 16 a desired user-defined configuration parameter, such as e.g. a desired seat row distance, into the documentation generating unit 16. In the next step, the processing unit 20 of the documentation generating unit 16 checks whether the user-defined configuration parameter is permissible or not against the background of the cabin equipment component data stored in the first database 12. For example, the processing unit 20 checks whether the desired seat row distance is realizable by means of corresponding cabin equipment components for which corresponding cabin equipment component data are stored in the first database 12.

If the checking step carried out by the processing unit 20 shows that the desired user-defined configuration parameter is permissible against the background of the cabin equipment components stored in the first database 12, the processing unit 20 checks in a second checking step whether the desired user-defined configuration parameter is also permissible against the background of the configuration rules stored in the second database 14. If not, a message is output via the output unit 22 of the documentation generating unit 16 that the desired user-specific configuration parameter contradicts the cabin equipment component data stored in the first database 12 and is therefore not permissible.

Similarly, a message is output via the output unit 22 that the desired user-defined configuration parameter contradicts the configuration rules stored in the second database 14 if the processing unit 20 ascertains in a second checking step that there are contradictions between the desired user-defined configuration parameter and the configuration rules stored in the second database 14. For example, an error message is output via the output unit 22 if a desired seat row distance input as the desired user-defined configuration parameter via the input unit 18 into the documentation generating unit 16 is less than a permissible minimum seat row distance.

If the checking steps carried out by the processing unit 20 of the documentation generating unit 16 show that the desired user-defined configuration parameter is permissible against the background of the cabin equipment component data stored in the first database 12 and the configuration rules stored in the second database 14, the processing unit 20 of the documentation generating unit 16 determines additional documentation-relevant configuration parameters on the basis of the user-defined configuration parameter and on the basis of an equation database. For example, the processing unit 20 determines, on the basis of the desired seat row distance input via the input unit 18 as the user-defined configuration parameter, the exact position of the aircraft passenger cabin for each seat, the processing unit 20 for this purpose using a starting position of the seat and a seat row number. These data may already be included in the equation database of the processing unit 20. Configuration parameters which are not contained in the equation database but are required for determining documentation-relevant configuration parameters are requested by the processing unit 20 from the user in a corresponding dialogue.

Finally, the processing unit 20 of the documentation generating unit 16 generates a complete documentation of the configured aircraft passenger cabin which contains, besides the user-defined configuration parameters input via the input unit 18, additional documentation-relevant configuration parameters, cabin equipment component data from the first database 12 and configuration rules from the second database 14. The documentation generated by the processing unit 20 is output via the display unit 22 of the documentation generating unit 16.

The invention claimed is:

1. System for configuring an aircraft passenger cabin, which system comprises:
   a first database, in which, for selected cabin equipment components, cabin equipment component data relevant to a configuration of the aircraft passenger cabin including these cabin equipment components are stored,
   a second database, in which configuration rules relevant to a configuration of the aircraft passenger cabin are stored, and
   a documentation generating unit which is adapted to generate a documentation of the configured aircraft passenger cabin on the basis of at least one user-defined configuration parameter and on the basis of the cabin equipment component data stored in the first database and of the configuration rules stored in the second database.

2. System according to claim 1,
   characterised in that the documentation generating unit is adapted to determine at least one documentation-relevant configuration parameter on the basis of at least one user-defined configuration parameter, and in that the documentation generating unit is further adapted to access an equation database to determine a documentation-relevant configuration parameter on the basis of a user-defined configuration parameter.

3. System according to claim 2,
   characterised in that the documentation generating unit is adapted to request at least one additional user-defined configuration parameter to determine a documentation-relevant configuration parameter.

4. System according to claim 1,
   characterised in that the documentation generating unit is adapted to compare a desired user-defined configuration parameter with the cabin equipment component data stored in the first database and/or the configuration rules stored in the second database and to generate a documentation of the aircraft passenger cabin configured with reference to the desired user-defined configuration parameter only if the desired user-defined configuration parameter is permissible against the background of the cabin equipment component data stored in the first database and/or the configuration rules stored in the second database.

5. System according to claim 1,
   characterised in that the cabin equipment component data stored in the first database, the configuration rules stored in the second database and/or the documentation of the configured aircraft passenger cabin generated by the documentation generating unit corresponds/correspond to certification rules laid down by manufacturers and/or authorities.

6. System according to claim 1,
   characterised in that the documentation generating unit comprises:
   an input unit for input of a desired user-defined configuration parameter by a user,
   a processing unit which is adapted to process the desired user-defined configuration parameter to generate the documentation of the configured aircraft passenger cabin, and
   an output unit which is adapted to output the documentation of the aircraft passenger cabin configured with reference to the desired user-defined configuration parameter or to output a message that the desired user-defined configuration parameter is not permissible against the background of the cabin equipment component data stored in the first database and/or the configuration rules stored in the second database.

7. System according to claim 6,
   characterised in that the processing unit of the documentation generating unit is implemented on a first computer, and in that the input unit and/or the output unit of the documentation generating unit is/are implemented on a second computer, the second computer being a computer spatially separated from the first computer.

8. Method for configuring an aircraft passenger cabin, having the steps:
   providing a first database, in which, for selected cabin equipment components, cabin equipment component data relevant to a configuration of the aircraft passenger cabin including these cabin equipment components are stored,
   providing a second database, in which configuration rules relevant to a configuration of the aircraft passenger cabin are stored, and
   generating a documentation of the configured aircraft passenger cabin on the basis of at least one user-defined configuration parameter and on the basis of the cabin equipment component data stored in the first database and of the configuration rules stored in the second database by means of a documentation generating unit.

9. Method according to claim 8,
characterised in that the documentation generating unit determines at least one documentation-relevant configuration parameter on the basis of at least one user-defined configuration parameter, the documentation generating unit accessing an equation database to determine a documentation-relevant configuration parameter on the basis of a user-defined configuration parameter.

10. Method according to claim 8,
characterised in that the documentation generating unit requests at least one additional user-defined configuration parameter to determine a documentation-relevant configuration parameter.

11. Method according to claim 8,
characterised in that the documentation generating unit compares a desired user-defined configuration parameter with the cabin equipment component data stored in the first database and/or the configuration rules stored in the second database and generates a documentation of the aircraft passenger cabin configured with reference to the desired user-defined configuration parameter only if the desired user-defined configuration parameter is permissible against the background of the cabin equipment component data stored in the first database and/or the configuration rules stored in the second database.

12. Method according to claim 8,
characterised in that the cabin equipment component data stored in the first database, the configuration rules stored in the second database and/or the documentation of the configured aircraft passenger cabin generated by the documentation generating unit corresponds/correspond to certification rules laid down by manufacturers and/or authorities.

13. Method according to claim 8,
characterised in that
a desired user-defined configuration parameter is input into an input unit of the documentation generating unit,
a processing unit of the documentation generating unit processes the desired user-defined configuration parameter to generate the documentation of the configured aircraft passenger cabin, and
the documentation of the aircraft passenger cabin configured with reference to the desired user-defined configuration parameter or a message that the desired user-defined configuration parameter is not permissible against the background of the cabin equipment component data stored in the first database and/or the configuration rules stored in the second database is output by an output unit.

14. Method according to claim 13,
characterised in that the processing unit of the documentation generating unit is implemented on a first computer, and in that the input unit and/or the output unit of the documentation generating unit is/are implemented on a second computer, the second computer being a computer spatially separated from the first computer.

\* \* \* \* \*